April 28, 1925.
S. A. STOETZEL
AUTOMOBILE SIGNAL
Filed Dec. 13, 1923
1,535,265
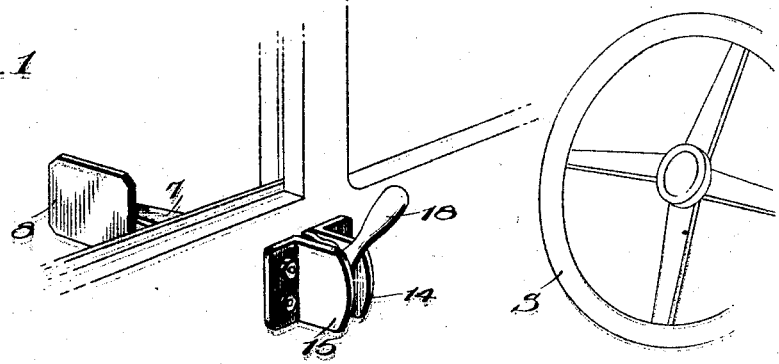
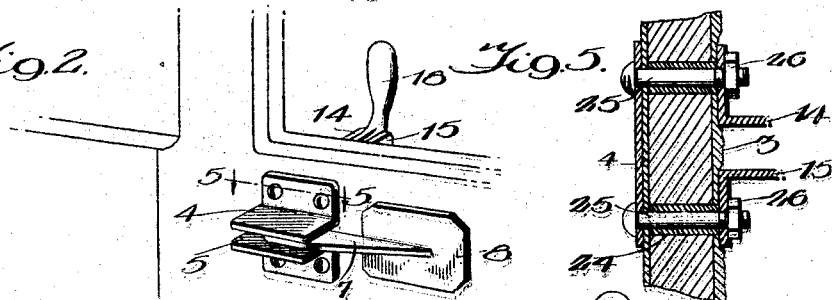
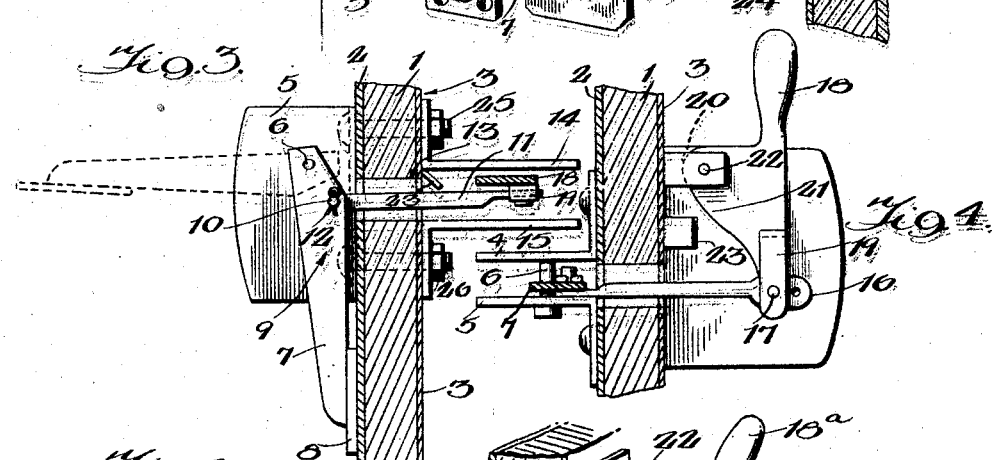
WITNESSES
INVENTOR
SIDNEY A. STOETZEL,
BY
ATTORNEYS Patented Apr. 28, 1925.

1,535,265

UNITED STATES PATENT OFFICE.

SIDNEY A. STOETZEL, OF OMAHA, NEBRASKA.

AUTOMOBILE SIGNAL.

Application filed December 13, 1923. Serial No. 680,536.

*To all whom it may concern:*

Be it known that I, SIDNEY A. STOETZEL, a citizen of the United States, residing at Omaha, in the county of Douglas, State of Nebraska, have invented certain new and useful Improvements in Automobile Signals, of which the following is a specification.

My invention relates to improvements in signals, particularly those adapted for use on motor vehicles, and it consists in the constructions, combinations and arrangements herein described and claimed.

An object of the invention is to provide a manually operated signal for motor vehicles which is arranged so that the signal arm may be extended from the inside of the vehicle thereby obviating the usual necessity of the driver extending his arm and hand.

A further object of the invention is to provide a signal of the character stated, the use of which will permit the driver to keep his hand inside of the vehicle when signaling is to be done, this feature being of particular value in inclement weather.

A further object of the invention is to provide a signal of the character described which is simple to manufacture, cheap so far as cost is concerned, composed of very few parts, readily applied to the motor vehicle, and easily operated.

Other objects of the invention will appear in the following specification, reference being had to the accompanying drawing, in which:

Figure 1 is a perspective view of enough of the inside of a motor vehicle to illustrate the application of the signal, Figure 2 is a perspective view of the outside of the vehicle showing the signal arm in retracted position, Figure 3 is a horizontal section of the signal, Figure 4 is a vertical section, Figure 5 is a detail section taken substantially on the line 5—5 of Figure 2, Figure 6 is a diagrammatic perspective view showing how a signal lamp may be employed for night use.

The signal is applied in any convenient position on a motor vehicle, but naturally in such a position to make it readily accessible by the driver. The drawing shows the signal applied to the framework of the vehicle which comprises a wooden or other structure 1, an outer sheet metal covering 2 and an inner covering or lining 3, representing the upholstery.

A pair of brackets 4 and 5 on the outside of the vehicle house the pivot 6 of an arm 7 which carries a signal 8. This signal may consist of a metallic plate preferably painted red. The pivot 6 may be mounted in any desired manner, its purpose being to so carry the arm 7 that it may be swung out into the positions shown in Figures 1 and 3.

An enlargement 9 at one side of the arm 7 has an aperture through which the hinge pin 10 of a link 11 extends. The hinge pin is held in position by a cotter 12. The link 11 extends through an opening 13 in the framework 1, and into the space between a pair of brackets 14 and 15 which stand at right angles to the bar on the outside. The inner end of the link 11 is flattened, at 6, (Fig. 4) and provided with several apertures into one of which the hinge pin 17 of an operating lever 18 is lodged. This pin is mounted between the lever and a piece of bent metal 19, thereby providing a shelter which receives the end of the link.

A somewhat similar piece of metal 20, situated near the upper edge of the bracket 14, defines a shelter which receives the heel 21 of the lever. This heel carries a pivot pin 22 which has bearing in the metallic piece 20 and in the adjacent side bracket. The handle of the lever is formed to provide a convenient grip.

A piece of metal 23, extending at an angle from the bracket 14, provides a stop which limits the movement of the lever upon depression thereof to extend the signal arm to the dotted line position in Fig. 3. Recognizing the fact that the upholstery on the interior of the vehicle as well as the framework in many instances will in a measure prevent the convenient application of the signal, provision is made of ferrules 24 which fit around the bolts 25 (Fig. 5) to provide supports against which the flanges of the inside brackets 14 and 15 may be clamped by nuts 26.

The ferrules, which are nothing more than metallic cylinders, are about equal in length to the thickness of the framework. They are intended to rest against the inside of the sheet metal covering 2 as shown in Fig. 5. The flanges of the inner brackets rest against the inner ends of the ferrules, and when the nuts 26 are screwed down on the bolts both sets of brackets will have been firmly fastened in position.

The modification in Figure 6 does not depart in principle from the form just described. The only difference lies in the provision of a lamp casing 27 at the free extremity of the arm 7ª. This casing has a lens 28, preferably of red glass, and when the lamp 29, on the inside of the casing, is illuminated, the resulting red light indicates the presence of the signal.

The arm 7ª is mounted as before, and this is also true of the lever 18ª. This lever carries a contactor 30 which engages a contact 31 when the lever is depressed and the signal arm is extended. Both the contactor and contact are insulated from adjacent metallic parts. An electric circuit embracing the battery B and the lamp 29 is established when the contactor engages the contact, whereby illuminating the lens 28 when the signal arm is extended.

The operation may be readily understood from the foregoing description. As shown in Fig. 1 the inside brackets 14 and 15 are so mounted on the inside of the vehicle that the operating lever 18 is easily accessible by the left hand of the driver, and he needs only to reach a short distance from the steering wheel S in order to grasp the handle.

The handle 18 is normally in a substantially upright position and stands only so far from the adjacent wall of the vehicle to permit the driver to insert his hand between. A movement of the handle toward the right moves the link outward and turns the signal arm 7 until it stands at right angles to the side of the vehicle, the movement being stopped by the engagement of the lever with the angle member 23. This is also the operation of the modification in Figure 6, the arrangement thereshown having the added advantage of a lamp 29 which is lighted upon the extension of the signal arm. This signal is adapted more particularly for night use, although it may be used in daytime as well.

In conclusion, it is to be observed that the operating lever 18 is supported on the bracket 14, the bracket 16 serving merely as a covering or shield. The two brackets constitute a housing which contains most of the lever 18 and its associated parts. Similarly, the bracket 4 constitutes a cover for the arm 7 which is mounted on the bracket 5. This too functions as a housing.

When the signal is displayed no one can misunderstand the meaning. It will protrude from the side of the vehicle far enough so that it cannot escape the attention of the driver of a following vehicle. The use of the signal may indicate an intention of the driver to make a turn or convey any other meaning which may be indicated by traffic regulations.

While the construction and arrangement of the improved signal as herein described and claimed is that of a generally preferred form, obviously modifications and changes may be made without departing from the spirit of the invention or the scope of the appended claims.

I claim:

1. A signal comprising brackets situated on the outside and inside of a vehicle respectively, bolts passing through the brackets and vehicle, a ferrule on each bolt serving as a spacer for the inside bracket, nuts on the bolts clamping the inside bracket against said ferrules, a link passing through the vehicle from one bracket to the other, an operating lever mounted on the inside bracket and connected with one end of the link, and a signal arm mounted on the outside and connected to the other end of the link.

2. A signal comprising a signal arm having a colored signal plate, a pair of horizontal spaced brackets, a pivot upon which said arm is mounted on the lower bracket, the upper bracket serving as a cover, a link connected with the arm and extending into a vehicle upon which said brackets are mounted, a pair of vertical spaced brackets on the inside between which said link extends, an operating lever situated in the space between the vertical brackets and having means by which it is mounted on one bracket the other bracket serving as a cover, the inner end of said link being connected with the lever; and a stop extending from the same bracket upon which the lever is mounted limiting that movement of the lever by which the signal arm is shifted to an operative position.

SIDNEY A. STOETZEL.